United States Patent
Lecler

(10) Patent No.: US 9,110,689 B2
(45) Date of Patent: Aug. 18, 2015

(54) AUTOMATIC PIPELINE STAGE INSERTION

(71) Applicant: QUALCOMM TECHNOLOGIES, INC., San Diego, CA (US)

(72) Inventor: Jean-Jacques Lecler, Sunnyvale, CA (US)

(73) Assignee: Qualcomm Technologies, Inc., San Diego, CA (US)

(*) Notice: Subject to any disclaimer, the term of this patent is extended or adjusted under 35 U.S.C. 154(b) by 308 days.

(21) Appl. No.: 13/680,399

(22) Filed: Nov. 19, 2012

(65) Prior Publication Data

US 2014/0143531 A1    May 22, 2014

(51) Int. Cl.
  G06F 9/00    (2006.01)
  G06F 17/50   (2006.01)
  G06F 9/445   (2006.01)
  G06F 9/38    (2006.01)

(52) U.S. Cl.
  CPC .............. *G06F 9/445* (2013.01); *G06F 9/3875* (2013.01); *G06F 17/505* (2013.01); *G06F 2217/84* (2013.01)

(58) Field of Classification Search
  CPC ...................................................... G06F 9/4411
  USPC ........................................................ 713/100
  See application file for complete search history.

(56) References Cited

U.S. PATENT DOCUMENTS

| | | | |
|---|---|---|---|
| 6,560,606 B1* | 5/2003 | Young | 1/1 |
| 6,834,378 B2* | 12/2004 | Augsburg et al. | 716/113 |
| 7,076,682 B2* | 7/2006 | Jacobson | 713/600 |
| 7,676,768 B1* | 3/2010 | Bourgeault et al. | 716/126 |
| 7,971,043 B2* | 6/2011 | Chang et al. | 712/229 |
| 8,793,644 B2* | 7/2014 | Michel et al. | 716/139 |
| 2013/0074033 A1* | 3/2013 | Hall et al. | 717/109 |

FOREIGN PATENT DOCUMENTS

| | | |
|---|---|---|
| EP | 1701251 A1 | 9/2006 |
| WO | 9008362 A2 | 7/1990 |

OTHER PUBLICATIONS

International Search Report and Written Opinion—PCT/US2013/070463—ISA/EPO—May 9, 2014.
Note S., et al., "Combined Hardware Selection and Pipelining in High-Performance Data-Path Design", IEEE Transactions on Computer Aided Design of Integrated Circuits and Systems, IEEE Service Center, Piscataway, NJ, US, vol. 11, No. 4, Apr. 1, 1992, pp. 413-423, XP000268824, ISSN: 0278-0070, DOI: 10.1109/43.125089 Section III; abstract Section V, subsections A, C.

* cited by examiner

*Primary Examiner* — Suresh Suryawanshi
(74) *Attorney, Agent, or Firm* — Muncy, Geissler, Olds & Lowe, P.C.

(57) ABSTRACT

The optimal configuration of a number of optional pipeline stages within the data paths of systems-on-chip is determined by application of a solver. The solver includes variables such as: the placement of modules physically within the floorplan of the chip; the signal propagation time; the logic gate switching time; the arrival time, after a clock edge, of a signal at each module port; the arrival time at each pipeline stage; and the Boolean value of the state of activation of each optional pipeline stage. The optimal configuration ensures that a timing constraint is met, if possible, with the lowest possible cost of pipeline stages.

13 Claims, 7 Drawing Sheets

AUTOMATIC PIPELINE STAGE INSERTION

TECHNICAL FIELD

This invention is in the field of semiconductor chip design. More specifically, this invention relates to the design of logic to achieve timing closure.

BACKGROUND

By dividing a process into steps, and performing the steps simultaneously on different data, the frequency at which the processing system can operate depends on the length of time to complete its slowest step. The same process performed with a shorter "slowest step" can be performed faster. Designing shorter steps in order to achieve higher speed generally requires creating more steps. More steps, given imperfect balancing of the length of steps, require more time to generate the resulting output from any particular input.

Processes are often referred to as pipelines. Storage devices between steps are referred to as pipeline stages. The number of steps in a processing system is referred to as the pipeline depth. Within a system-on-chip (SoC) data moves through a pipeline no faster than one stage per clock cycle. Therefore, the number of stages determines the number of clock cycles for each input datum to be fully processed. Such time is often referred to as latency. Longer latency due to pipeline stages is undesirable, but the faster clock frequency due to pipeline stages is desirable. Designing an optimal number of pipeline stages requires a trade-off between clock frequency and cycles of latency.

Within the design of a data processing chip it is not immediately clear how to optimally apply pipelining. The conventional method of designing a pipeline that works is an iterative process of experimentation. It is time consuming. Furthermore, it rarely results in an optimal design.

The problem is further complicated when the physical layout of the chip is considered. The length of time for data to propagate from a point of production to a point of consumption depends on the distance and the average propagation rate through the wires between those points. Conventionally, the physical layout is considered at a later stage in the chip design process than the decisions about pipelining. To avoid unexpected problems achieving the desired clock frequency during physical design, pipeline stages are placed at smaller increments within the processing logic, thereby leaving extra time for data to propagate between points if they happen to be distant in the physical design. This over-design of pipeline stages costs area, power consumption, and especially latency. Therefore, what is needed is a system and method to automatically determine optional pipeline stages in order to meet clock frequency constraints.

SUMMARY

The disclosed invention is a method and electronic design system to automatically activate optional pipeline stages in order to meet clock frequency constraints. In alternative embodiments of the invention, the location of data processing modules within chips is determined in conjunction with the configuration of pipeline stages.

DETAILED DESCRIPTION

This invention relies on an ability to determine a number of data path connections within the logic of a system on a chip or system-on-chip (SoC) where a pipeline stage can be inserted. A pipeline stage is an array of flip-flops (flops) that stores at least a word of data. It generally has the benefit of dividing the signal propagation delay through the path into two shorter paths such that a shorter clock period (a higher clock frequency) can be used to synchronize the SoC. Such data path connections are known as optional pipeline stages. The chip can function correctly with or without each pipeline stage. When present, the optional pipeline stage is said to be activated. A set of activated optional pipeline stages is known as a configuration.

Figure 1:
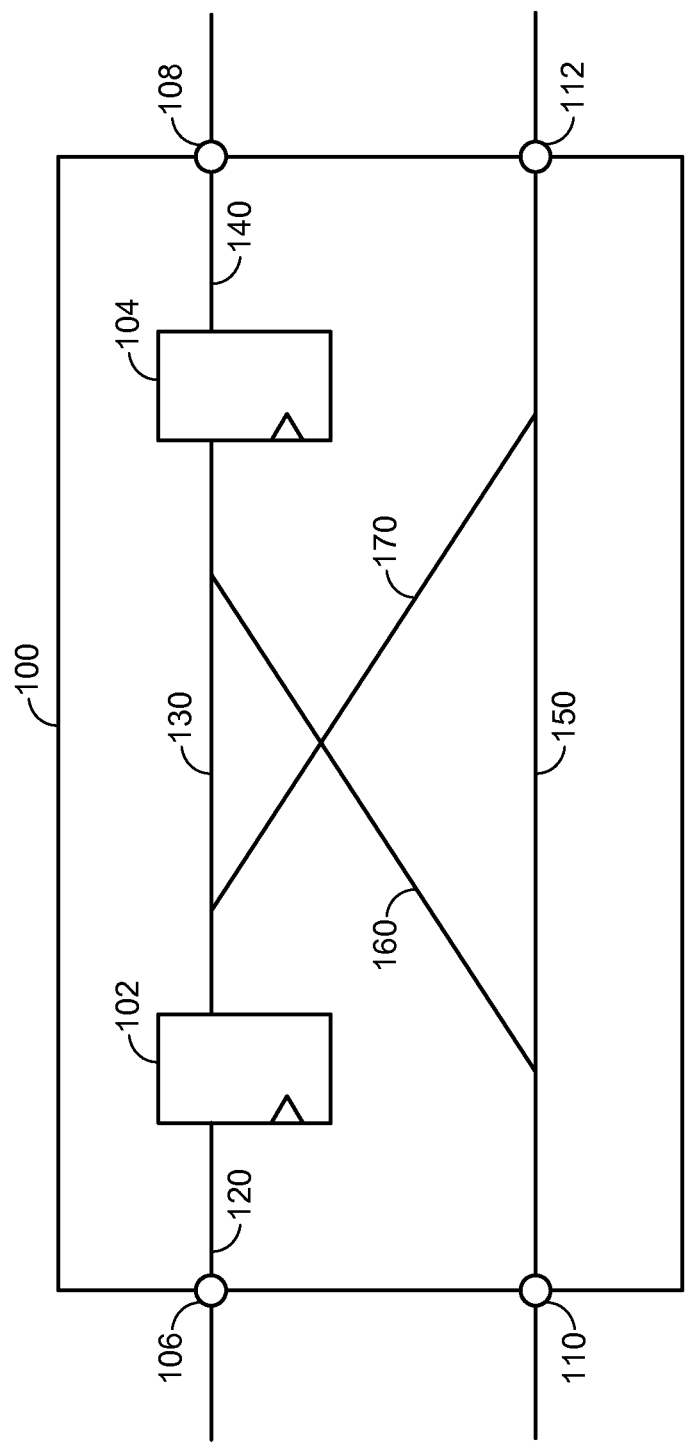
FIG. 1 illustrates a module, as in SoCs, with pipeline stages.

FIG. 1 illustrates module 100, comprising a first pipeline stage 102 and second pipeline stage 104. Pipeline stages, each comprising parallel flip-flops, are depicted with the conventional symbol of a flip-flop. Lines represent paths through logic elements, the logic elements are not shown. Path 120 connects input 106 to pipeline stage 102. Path 130 connects pipeline stage 102 to pipeline stage 104. Path 140 connects pipeline stage 104 to output 108. Path 150 connects input 110 to output 112. Path 160 connects input 110 to pipeline stage 104 through logic shared with path 130 and 150. Path 170 connects pipeline stage 102 to output 112 through logic shared with path 130 and 150.

Figure 2:
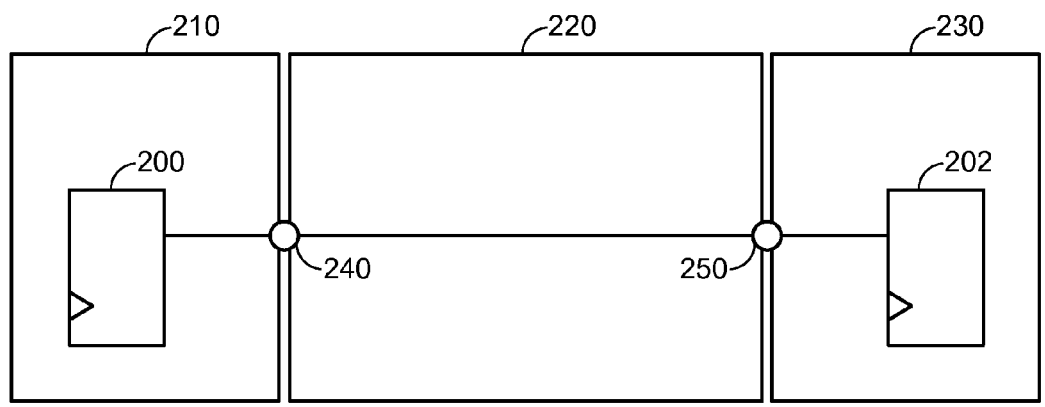
FIG. 2 illustrates a path between pipeline stages, the path occurring in three modules.

This illustrates the four types of path segments on which signals, the time of which can be calculated, can propagate within a module:

input to pipeline stage (paths 120 and 160);
  pipeline stage to pipeline stage (path 130);
  pipeline stage to output (paths 140 and 170);
  input to output (path 150);

FIG. 2 illustrates a full path between a first pipeline stage 200 and a second pipeline stage 202. The path occurs in three interconnected modules 210, 220, and 230. The full path comprises a pipeline stage to output path segment from pipeline stage 200 to connection 240, an input to output path segment from connection 240 to connection 250, and an input to pipeline stage path segment from connection 250 to pipeline stage 202.

Every flop, and therefore every pipe stage, has a unit cost in terms of silicon area. It also has a cost in terms of power consumption as a result of the power used to drive flops switching current and power used to toggle the clock tree. The cost is approximately proportional to the number of flops, which is generally approximately proportional to the width of the data in the data path.

In practice, chips are designed with the underlying constraints of target clock frequencies in different parts of the chip and a target cell library for a particular CMOS process node.

Most SoCs are designed as an interconnection of modules. Each module has a number of optional pipeline stages, a number of inputs, a number of outputs, and a number of required registers. Timing within the module from flop to flop, input to flop, flop to output, and input to output can be determined for the module alone. The flop to output and input to flop delay can be added together where there is connectivity between modules in the SoC. Registers comprise flops as do optional pipeline stages when activated.

Some SoC designs contain non-sythesizable logic blocks, such as memory arrays or register files. With regard to delay analysis, those blocks may be described with the same formalism as synthesized gates. Their interface ports are usually comparable to register ports.

Figure 3:
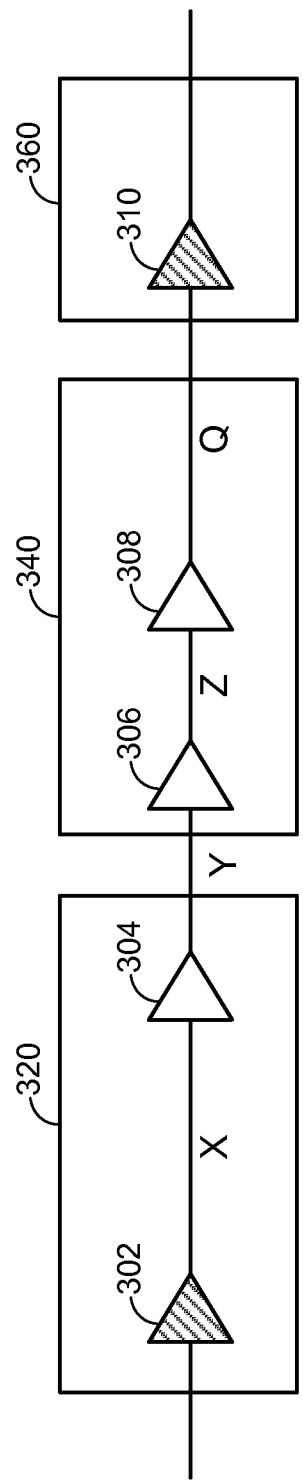
FIG. 3 illustrates a sequence of optional pipeline stages in a path, a subset of which is enabled.

FIG. 3 illustrates a sequence of pipeline stages. Pipeline stages are depicted as triangles for simplicity. Each optional pipeline stage is shown in white and can be activated or not. Fixed pipeline stages are shown in grey. The full path occurs in modules 320, 340, and 360. The path begins at pipeline stage 302, traverses optional pipeline stages 304, 306, and 308, and ends at pipeline stage 310. Path segment X is from pipeline stage 302 to pipeline stage 304. Path segment Y is from pipeline stage 304 to pipeline stage 306. Path segment Z is from pipeline stage 306 to pipeline stage 308. Path segment Q is from pipeline stage 308 to pipeline stage 310.

Figure 4:
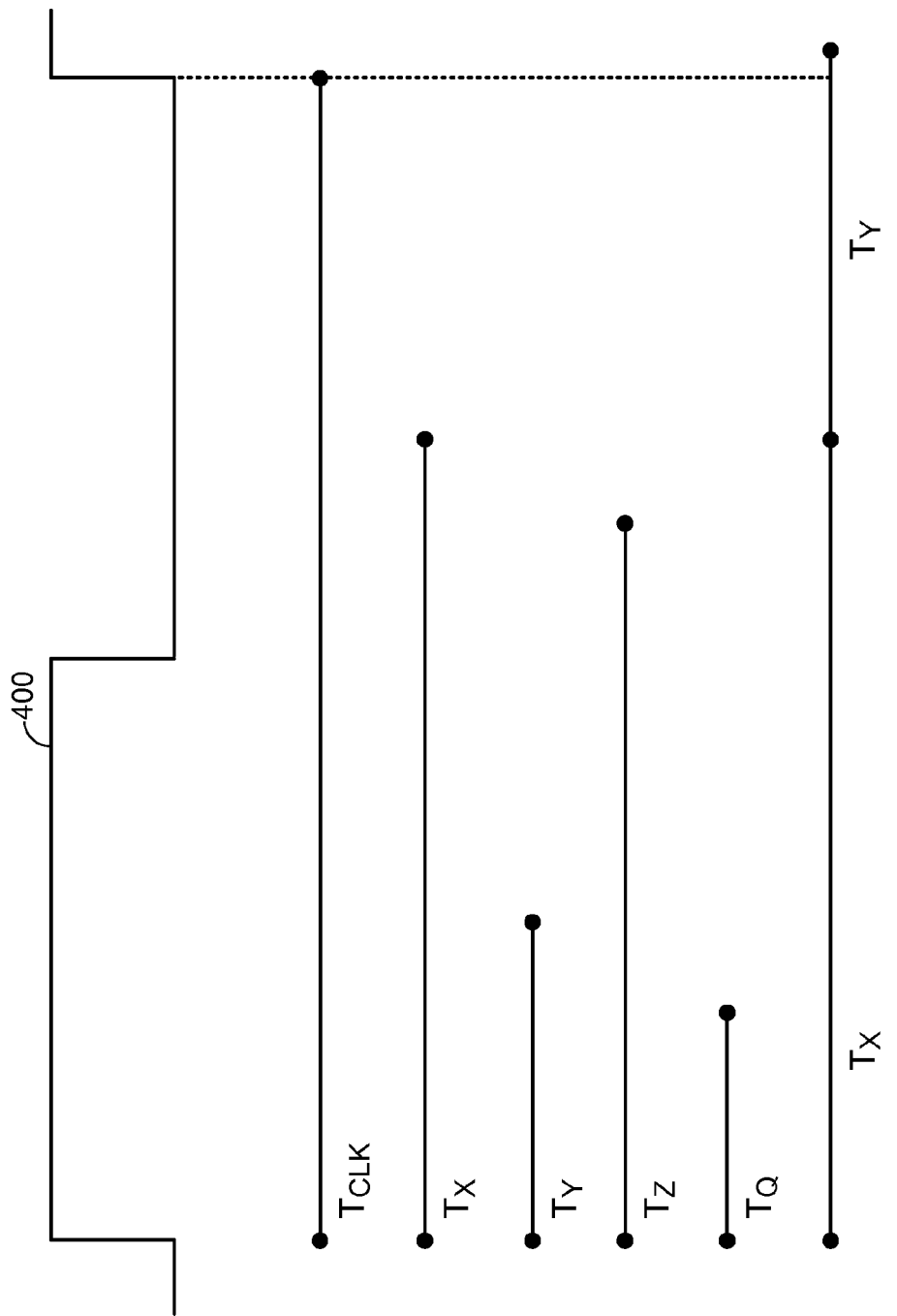
FIG. 4 illustrates signal propagation times through a path.

Timelines of signal propagation delays are shown in FIG. 4. Clock cycle 400 has duration $T_{CLK}$. FIG. 3 path segments X, Y, Z, and Q take FIG. 4 time $T_X$, $T_Y$, $T_Z$, and $T_Q$ time, respectively. Signal propagation time from FIG. 3 register 302 to optional pipeline stage 308, consisting of path segments X, Y, and Z, takes $T_X$ plus $T_Y$ plus $T_Z$ propagation time, which is shown in FIG. 4. The cumulative time exceeds the duration of $T_{CLK}$. Activating optional pipeline stage 304 would break the long timing path. The timing path from pipeline stage 304 through $T_Y$, $T_Z$, and $T_Q$ also violates the $T_{CLK}$ timing constraint. Activating pipeline stage 308 would resolve that violation. However, activating pipeline stage 306 would resolve both timing violations with less cost.

Figure 5:
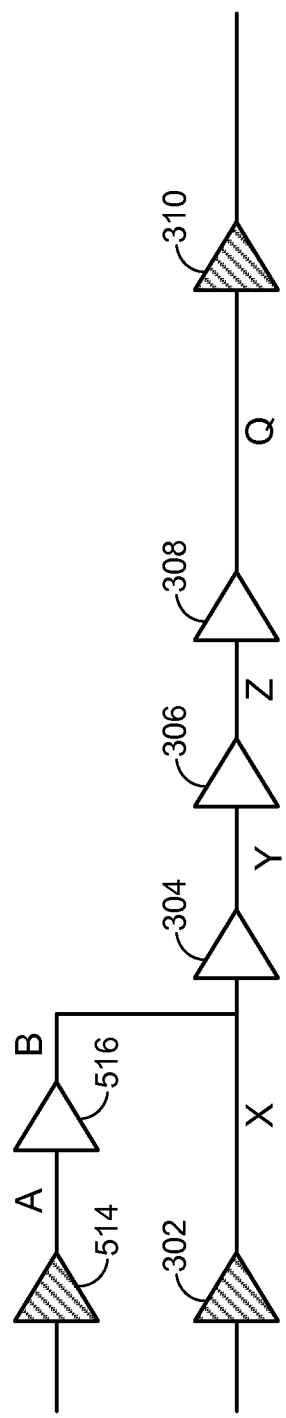
FIG. 5 illustrates two sequences of optional pipeline stages on correlated paths, a subset of which is enabled.

The best configuration of pipeline stages is less clear when multiple paths pass through optional pipeline stages. In accordance with various aspects of the present invention, FIG. 5 illustrates the sequence of FIG. 3 with an additional sequence of optional pipeline stages that share a path. The second path begins at register 514, traverses optional pipeline stages 516, 304, 306, and 308, and ends at register 310. Path segment A is from pipeline stage 514 to pipeline stage 516. Path segment B is from pipeline stage 516 to pipeline stage 304.

Figure 6:
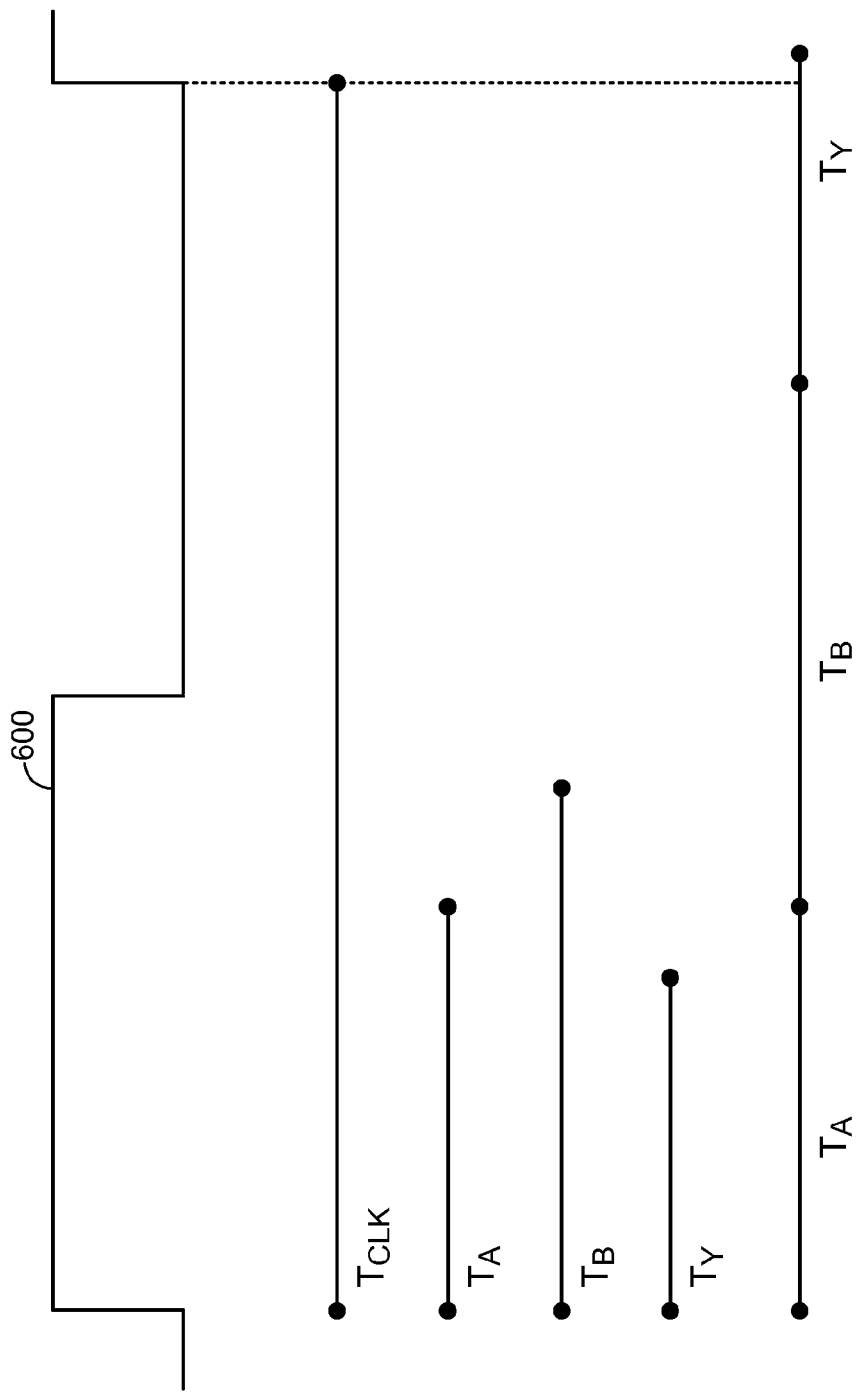
FIG. 6 illustrates signal propagation times through a correlated path.

Timelines of signal propagation delays are shown in FIG. 6, in accordance with the various aspects of the present invention. As in FIG. 4, clock cycle 400 has duration $T_{CLK}$. FIG. 5 path segment A signal propagation takes FIG. 6 $T_A$ time. FIG. 5 path segment B signal propagation takes FIG. 6 $T_B$ time. Signal propagation time from FIG. 5 pipeline stage 514 to optional pipeline stage 306, consisting of path segments A, B, and Y takes FIG. 6 $T_A$, $T_B$, $T_Y$ propagation time. The cumulative time of which exceeds the duration of $T_{CLK}$. The cumulative time of $T_X$ and $T_Y$ is less than the duration of $T_{CLK}$. Therefore, activating pipeline stage 304 resolves the timing violation, but activating pipeline stage 306 does not.

The activation or deactivation of each pipeline stage affects all paths through it, and therefore all other pipeline stages traversed by all of those paths and so forth. Typical SoC designs have thousands of paths sharing each of hundreds of optional pipeline stages.

One approach that designers use is an iterative process of experimentation to determine a best configuration of optional pipeline stages. A method is to begin with no pipeline stages then repeatedly synthesize the design, analyze timing, and add a pipeline stage at the point in the logic of the slowest critical path.

An experienced designer considers all factors and creates an initial configuration that is more likely to meet the constraints. This approach will require fewer iterations and thereby tend to add fewer unnecessary pipeline stages. However, if the initial configuration is too pessimistic then this approach will still have unnecessary pipeline stages.

Another method, in accordance with other aspects of the present invention, would iterate automatically, considering where there is extra slack and accordingly moving pipeline stages farther apart in the logic paths. That will cause paths between other pipeline stages to be shortened, which will cause other pipeline stages to be moved. In this case, even small changes potentially cause changes in many other optional pipeline stages of the chip and so a large number of iterations would still be required to approach an optimal configuration.

Logic Synthesizers

System-on-chip designers commonly use logic synthesizers. Those tools take a logic behavior as input, and produce as an output an arrangement of logical gates that realizes the behavior and meets maximum long path requirements, on a given process node and a target clock frequency. Different configurations of a module with regard to pipeline stages have different behaviors; a logic synthesizer is not able to select a configuration: it tries and optimizes the one it has been given as an input.

The implementation of a logic synthesizer consists of two phases. In a first phase, called mapping, the behavior is translated into an arrangement of gates. In a second iterative phase, called timing optimization, parts of the arrangement are modified to shorten the longest path, while keeping the same behavior. Many timing optimization techniques have been described and all imply using more silicon area and more power. The stronger the timing constraints are, the higher the impact on area and power are expected to be, until the logic synthesizers fails to find a solution to the problem. The optimization is always limited by the longest path: one path longer than required is enough to make the logic synthesizer fail.

Finding the optimal configuration would basically require all configurations to be separately synthesized. The present invention determines, for given constraints of target clock frequency and CMOS process node, without iteration, an optimal pipeline stage configuration that, when passed the logic synthesizer mapping phase, presents an even timing optimization problem. The timing optimization is then more likely to converge, in a shorter time frame, and with less area and/or power impact.

Linear Equations

In accordance with the various aspects of the present invention, embodiments of the invention use a mixed integer programming linear equation solver to compute an optimized configuration of optional pipeline stages.

Full system timing can be broken down into smaller tasks by analyzing individual module timings. This makes the full system analysis simpler, as only the number of optional pipeline stages within a module need be considered at a time when calculating timing. Determining the optimal configuration of a module depends on calculating timing with every combination of optional pipelines stages activated. This would require $2^N$ calculations, where N is the number of optional pipeline stages within the module. In practice, timing calculated with each optional pipeline stage activated alone gives a nearly optimal guess of the best configuration. This method requires only N+1 calculations. In accordance with the disclosure of the present invention as related to the various embodiments, this method is used to improve run time.

Timing is calculated within each module by running a synthesis process on a configuration of a model of each instantiated module. The synthesis does not generate a netlist of standard cells, but does generate a delay estimate of timing arcs between flip-flops, inputs and outputs.

In accordance with various aspects of the present invention, the following steps are performed:

1. Perform a synthesizer mapping phase on each module, once with each optional pipeline stage activated alone and once with no pipeline stage, to generate a timing and area estimate for the module.
2. Build timing arrays of the synthesized timing values for each pipeline stage; with an array for each of input to flop, flop to flop, flop to output, and input to output timing. Sort each array of pipe stages in order of timings.
3. Use a linear programming solver such as the open source Ipsolve mixed-integer linear programming solver.

A resulting optimal configuration of optional pipeline stages is represented as a vector of Boolean values that is the lowest cost solution to a system of linear equations. A linear problem is a set of inequalities of a set of variables. Lpsolve is used to find an optimal solution vector that meets all timing constraints, if possible.

The variables include:
1. the arrival time of signals per module port and
2. Boolean state of activation per optional pipeline stage.

Inequalities for the solver include:
1. For each module output port:
arrival time≥clock-to-output delay of the module; and
arrival time≥input port arrival time+input to output delay.
2. For each input port connected to each activated pipeline stage:
input port arrival time+input port to flip-flop delay clock period.

Within modules, input port to output port, input port to pipe stage, and pipe stage to output port connectivity and a timing estimate for each connection is known from the models of the configuration of each module instance. The timing, as well as an area estimation, is derived from a synthesis algorithm on the instances of configured modules. The synthesis algorithm is generic across process technologies.

The cost function to be minimized is the sum of the cost of each activated pipeline stage. The cost of each activated pipeline stage is determined by the area estimation. In another embodiment cost is a function of area estimation and power consumption.

Figure 7:
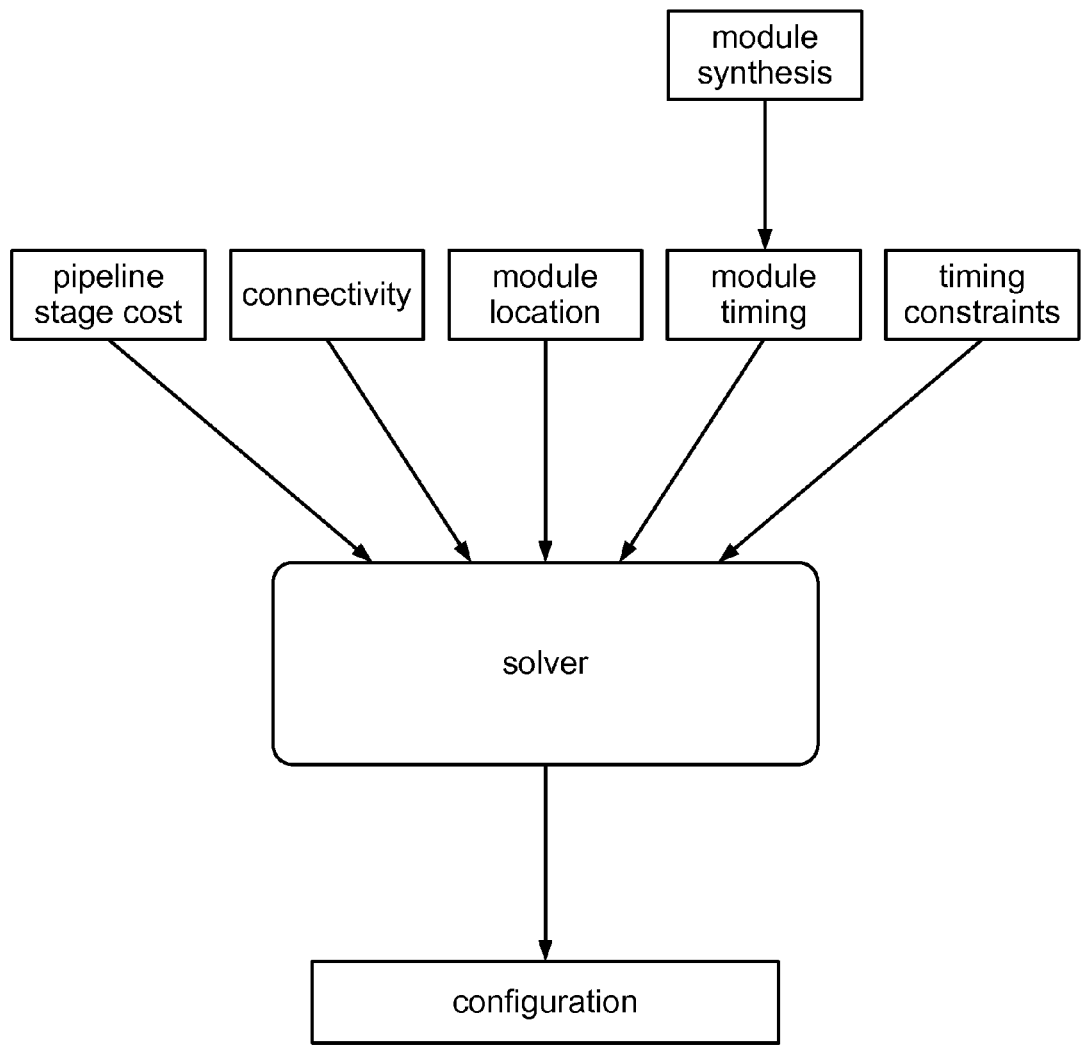
FIG. 7 is a process flow diagram according to an embodiment.

FIG. 7 shows a process flow diagram in accordance with one aspect of the present invention with an embodiment of automatic pipeline stage insertion. The considerations of pipeline stage cost, connectivity, module location, module timing as determined by a synthesis process, and timing constraints are input to the solver. The solver outputs an optimal configuration if one can be found that meets the criteria of all inequalities.

In accordance with another aspect of the present invention, another embodiment considers the data processing latency introduced by pipeline stages. Forward pipeline stages are ones that store datapath signals in flops such that no forward-going combinatorial paths traverse the pipeline stage. That includes the data path as well as sideband signals and forward-going flow control signals. Backward pipeline stages store datapath signals in flops, thereby having a similar cost as forward-going pipeline stage, but have datapath multiplexing and other forward-going combinatorial logic paths. Backward pipeline stages ensure that no combinatorial paths are present on backward-going flow control signals. A key difference is that forward pipeline stages add a cycle of latency to transactions and backward pipeline stages do not. If a combinatorial logic path may be broken on both forward-going and backward-going signals, it is generally preferable to break the path with a backward pipe stage.

Desired maximum data processing latency between any point of data production and point of data consumption is a constraint on the solver. The embodiment includes the additional variable of a target latency per initiator-target connectivity. An additional inequality is, that for each connection between initiator and target, the number of activated optional pipeline stages in path latency constraint.

In accordance with another aspect of the present invention, another embodiment of the invention considers not just synthesized timing within modules, but the time required for the propagation of signals between modules. The locations of modules within the chip floorplan are used, a simple table of their relative distances is used, or both are used with a function between delay and distance. Module locations are represented in a simplified format, with a single x and y coordinate. In accordance with one aspect of the present invention, in one embodiment the function is a simple delay proportional to the Manhattan distance between modules. In accordance with another aspect of the present invention, in another embodiment the delay is a super-linear function of distance in order to account for vias, obstructions, and varying propagation times on different metal layers. Output port to input port connectivity between modules is known from the SoC architecture level netlist. Output port to input port delay is estimated by a signal propagation speed multiplied by the distance.

The application of a linear equation solver to the configuration of optional pipeline stages is extended from that previously described. Additional variables include:
3. x axis location per module;
4. y axis location per module;
5. distance per connected pair of modules;

Additional inequalities include:
3. For each pair of connected module 1 and module 2:
distance≥$x_1-x_2+y_1-y_2$;
distance≥$x_1-x_2+y_2-y_1$;
distance≥$x_2-x_1+y_1-y2$; and
distance≥$x_2-x_1+y_2-y_1$.
4. For each module input port:
arrival time≥arrival time at a connected output port+distance*signal propagation rate.

A resulting optimal configuration of optional pipeline stages is represented as a vector of Boolean values along with arrays of x and y coordinates for each module.

A network-on-chip is a component within the design of an SoC. A network-on-chip, designed modularly, lends itself to presenting data path connections where a pipeline stage can be simply inserted without changing the correctness of chip functionality. The logic and wires of a network-ok-chip span relatively long distance. As a result, some embodiments of this invention are applied particularly to a network-on-chip.

The various aspects of the present invention may be implemented in software, hardware, application logic, or a combination of software, hardware, and application logic. The software, application logic and/or hardware may reside on a server, an electronic device, or a service. If desired, part of the software, application logic and/or hardware may reside on an electronic device, part of the software, application logic and/or hardware may reside on a server.

While the present invention has been described with reference to the specific applications thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the present invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

Although various aspects of the present invention are set out in the independent claims, other aspects of the invention comprise any combination of the features from the described embodiments and/or the dependent claims with the features of the independent claims, and not the solely the combination explicitly set out in the claims.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The invention claimed is:

1. A method of configuring optional pipeline stages within a system on a chip, the system comprising modules where each module includes one or more optional pipeline stages, the method comprising the steps of:
   determining a unit cost for each optional pipeline stage;
   determining a timing delay for each configuration of activated optional pipeline stages in a plurality of configurations, wherein each configuration of activated optional pipeline stages is such that for each module at most only one of the optional pipeline stages within that module is activated; and
   using a solver to find a system configuration of activated optional pipeline stages among the plurality of configurations that meets a constraint on the timing delay to minimize a total cost, the total cost including the unit cost for each activated optional pipeline stage.

2. The method of claim 1, each module comprising at least one input and at least one output, the method further comprising the step of determining connectivity between outputs of the modules and inputs of the modules.

3. The method of claim 2, further comprising the step of determining a distance between the modules within the chip.

4. The method of claim 3 wherein the timing delays are functions that depend on the distance between the modules.

5. The method of claim 1 wherein the unit costs are functions that depend on a number of flip-flops in each optional pipeline stage.

6. The method of claim 1 wherein the unit costs are functions that depend on die area.

7. The method of claim 1 wherein the unit costs are functions that depend on a measure of power consumption.

8. The method of claim 1 wherein the constraint is a desired maximum data processing latency.

9. The method of claim 1 wherein the timing delays are functions that depend on a CMOS process node.

10. The method of claim 1 wherein the solver is a mixed integer programming solver.

11. The method of claim 1 wherein the optional pipeline stages are components of a network-on-chip.

12. A computer comprising:
   at least one processor; and
   memory in communication with the at least one processor, the memory including computer program code, the computer program code being configured to, with the at least one processor, cause the computer, at least, to:
      determine unit costs for a plurality of optional pipeline stages in a plurality of modules in a system on a chip where each module includes one or more optional pipeline stages;
      determine a system timing delay for each configuration in a plurality of configurations, where each configuration is such that for each module at most only one of the optional pipeline stages within that module is activated; and
      use a solver unit to select a configuration among the plurality of configurations for the system on a chip, wherein the configuration meets a constraint on the system timing delay to minimize a total cost, the total cost including the unit cost for each activated optional pipeline stage.

13. A non-transitory computer readable medium having instructions stored thereon to cause at least one processor to perform a method comprising:
   determining unit costs for a plurality of optional pipeline stages in a plurality of modules in a system on a chip where each module includes one or more optional pipeline stages;
   determining a system timing delay for each configuration in a plurality of configurations, where each configuration is such that for each module at most only one of the optional pipeline stages within that module is activated; and using a solver unit to select a configuration among the plurality of configurations for the system on a chip, wherein the configuration meets a constraint on the system timing delay to minimize a total cost, the total cost including the unit cost for each activated optional pipeline stage.

* * * * *